March 28, 1939. H. L. BAUMER 2,152,021
SAFETY DEVICE FOR STEERING MOTOR VEHICLES
Filed Feb. 26, 1937 2 Sheets-Sheet 1
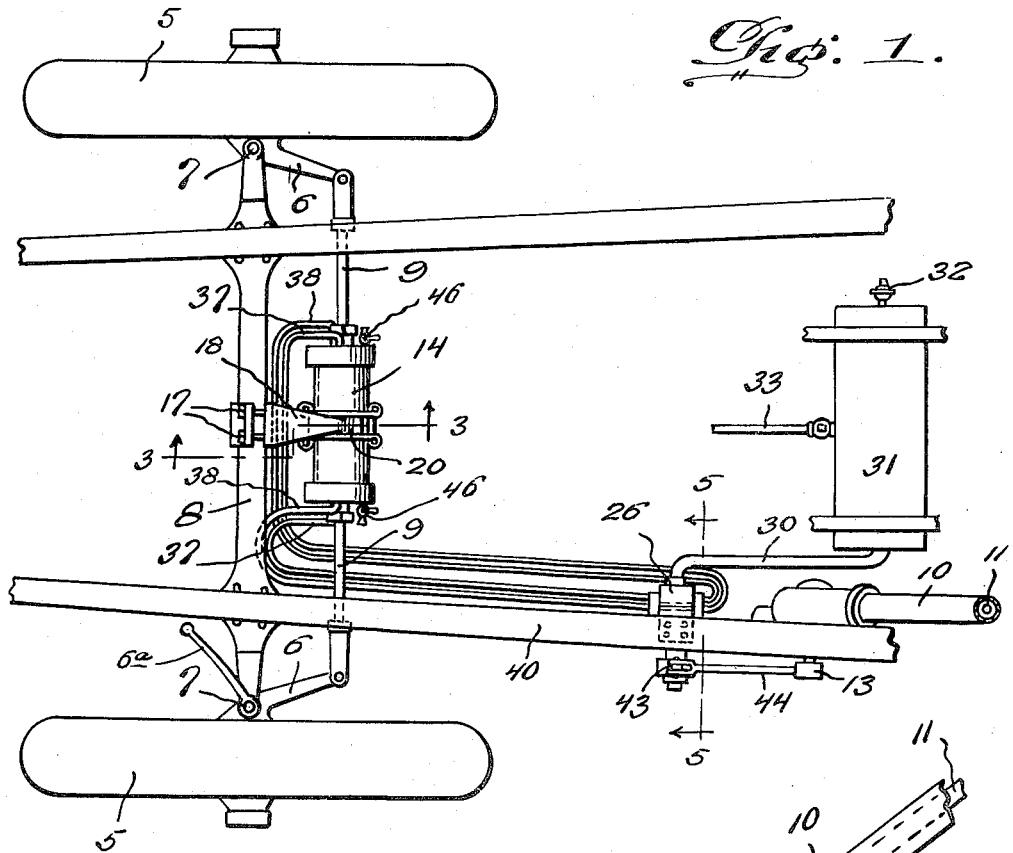
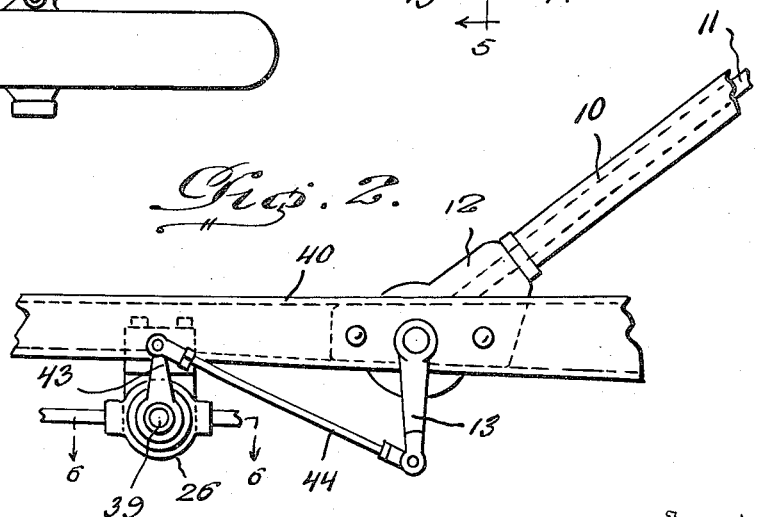
Inventor
Harry L. Baumer;
By J. Stanley Burch
Attorney

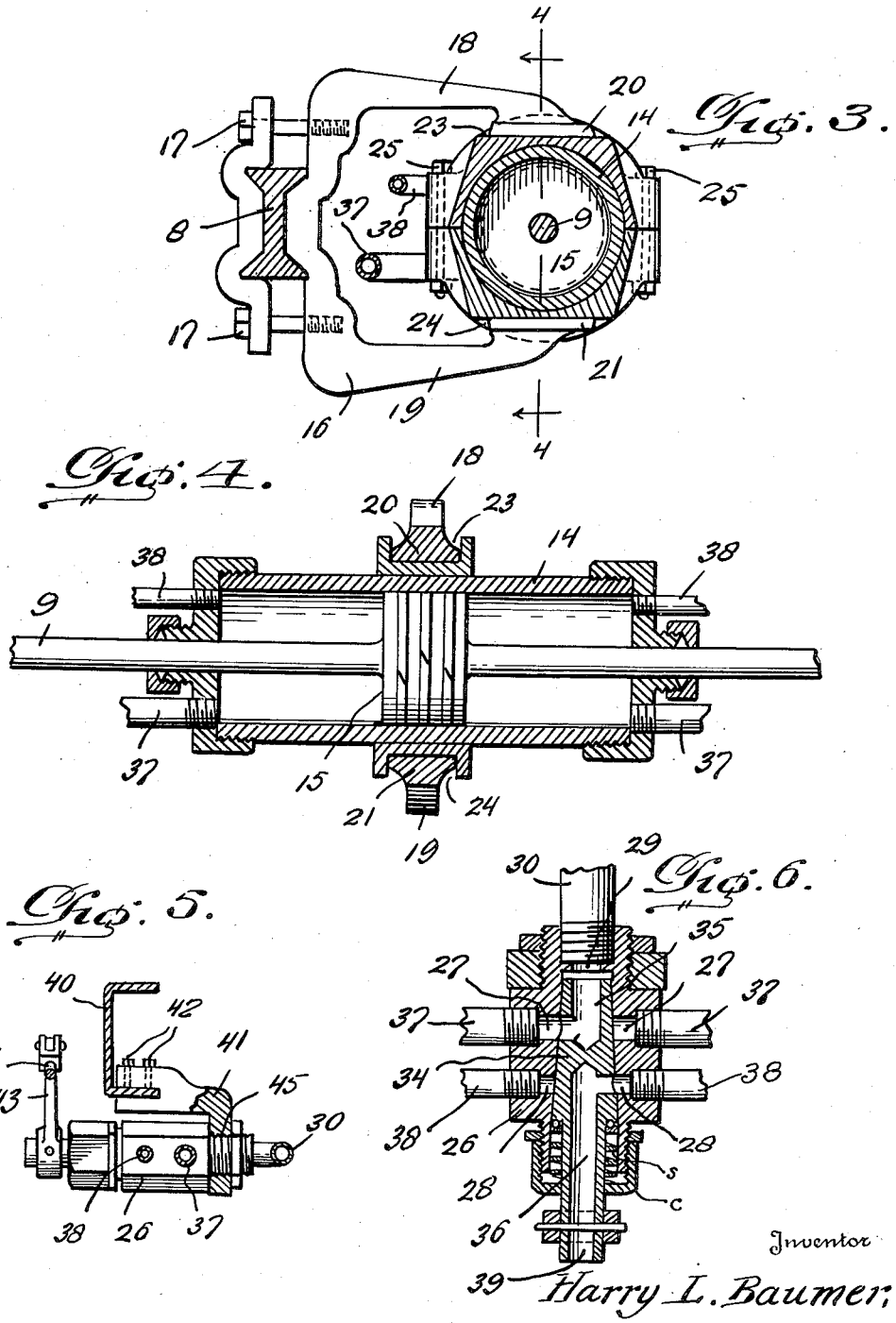

Patented Mar. 28, 1939

2,152,021

UNITED STATES PATENT OFFICE 2,152,021

SAFETY DEVICE FOR STEERING MOTOR VEHICLES

Harry Leland Baumer, Tulsa, Okla.

Application February 26, 1937, Serial No. 127,879½

5 Claims. (Cl. 180—79.2)

This invention relates to an improved steering device for motor vehicles, and the primary object of the present invention is to provide a fluid-pressure operated means for actuating the steering gear of a motor vehicle, so as to decrease the labor of steering and at the same time increase safety in driving.

The present invention contemplates a power steering device of the above kind in which a fluid-pressure motor is associated with the tie rod connecting the steering knuckles of the motor vehicle, and a further object of the present invention is to provide improved means for mounting this fluid-pressure motor on the intermediate or main front axle member of the vehicle for free movement forwardly or rearwardly with the tie rod and with respect to said main front axle member when the front steering wheels of the vehicle are turned.

A still further object of the present invention is to provide a novel form of valve and operating means therefor, for controlling the flow of pressure fluid to and from the fluid-pressure motor, whereby steering of the vehicle may be conveniently and effectively controlled by operation of the usual steering shaft of the steering column or post of the motor vehicle.

Other objects and features of the present invention will become apparent from the following description when considered in connection with the accompanying drawings, in which:

Figure 1 is a plan view of part of a motor vehicle chassis equipped with a steering device embodying the present invention.

Figure 2 is a fragmentary elevational view of the construction shown in Figure 1, illustrating the control valve and its connection with the steering shaft.

Figure 3 is an enlarged fragmentary section on line 3—3 of Figure 1.

Figure 4 is an enlarged section through the fluid-pressure motor on line 4—4 of Figure 3.

Figure 5 is a transverse section on line 5—5 of Figure 1; and

Figure 6 is an enlarged section on line 6—6 of Figure 2.

Referring in detail to the drawings, the usual front steering and supporting wheels 5 are journaled on stub axles of steering knuckles 6 pivoted at 7 to the ends of a main or intermediate front axle section 8, the steering knuckles 6 being connected by the usual tie rod 9. The vehicle also has the usual steering post or column 10 in which is journaled a steering shaft 11 which may carry the usual steering handle or wheel at its upper end and which is operatively geared at its lower end and within a gear box 12 with a depending steering arm 13. The arm 13 is usually connected by a drag link with a second steering arm rigidly connected with the left hand steering knuckle 6, which parts are omitted when the vehicle is equipped with the present steering device.

In accordance with the present invention, a fluid-pressure motor is supported by the main axle section 8 and includes a cylinder 14 through which the tie rod 9 extends, and a piston 15 carried by said tie rod 9 and movable in the cylinder 14. As the wheels 5 are turned or steered, there will be a movement forwardly or rearwardly, of tie rod 9 with respect to axle section 8, and I provide novel means for mounting the cylinder 14 on the axle 8 so as to permit said cylinder to partake of these movements of tie rod 9. As shown, such means consists of a substantially C-shaped bracket 16 firmly bolted at 17 to the intermediate portion of axle section 8 and including rearwardly projecting upper and lower arms 18 and 19 respectively provided at their rear ends with shoes 20 and 21 which are in spaced relation and face toward each other. These shoes slidably engage in transverse guideways provided at the top and bottom of the intermediate portion of cylinder 14, so that the cylinder 14 is slidably mounted between the shoes 20 and 21 for rearward or forward sliding movement with respect to axle section 8, although restrained against movement transversely of the vehicle. The guideways in which shoes 20 and 21 engage are formed at 23 and 24 of a flanged collar or ring formed of half sections tightly bolted about the cylinder 14 as at 25, for convenience and economy of manufacture and assembly.

A novel form of valve 26, of the turn plug type, is operatively connected to steering arm 13 for controlling the flow of pressure-fluid to and from the opposite ends of cylinder 14 and causing the desired actuation of piston 15 for turning the steering wheels 5. As shown more clearly in Figures 2, 5 and 6, this valve includes a suitable casing provided at each of opposite sides with a relatively large supply port 27 and a relatively smaller exhaust port 28, as well as having at its inner end a supply port 29 adapted to be connected by a pipe 30 with the source of fluid under pressure which may consist of a storage tank 31. The tank 31 preferably has a safety pressure relief valve 32 and may be supplied with air or other fluid under pressure through a check controlled inlet pipe 33, an engine driven compressor having its outlet connected to pipe 33 in case the pressure fluid is air. The control valve further includes a turn plug 34 rotatably fitted in the casing of the valve and having an angular passage 35 therethrough at its inner end and an angular passage 36 therethrough at its outer end. The supply ports 27 of the control valve are connected by pipes 37 with opposite ends of cylinder 14, respectively, as shown clearly in Figures 1 and 4. In a like manner, the exhaust ports 28 of the valve are connected by smaller pipes 38 with opposite ends of cylinder 14, respectively. The arrangement is such that when plug 34 is in the position of Figure 6, communication is established between supply pipe 30 and the pipe 37 which connects with the left hand end of cylinder 14, communication being simultaneously established between passage 36 and the exhaust pipe 38 which connects with the right hand end of cylinder 14. Thus, as fluid under pressure is allowed to flow into the left hand end of cylinder 14 for moving the piston 15 to the right and thereby steering the vehicle to the left, the pressure fluid in the right hand end of cylinder 14 is allowed to escape therefrom, ultimately exhausting into the atmosphere through passage 36 of the control valve, one end of said passage 36 being open to the atmosphere as shown at 39. Due to the fact that the pipes 38 and ports 28 are relatively small, a back pressure will be maintained on the exhausting pressure fluid so as to insure steady movement of piston 15 as required for smooth and safe steering. The reverse of this operation takes place when the plug 34 is turned one-half revolution so as to provide communication between supply pipe 30 and the other pipe 37 and to simultaneously establish communication between the other pipe 38 and the atmosphere by way of passage 36, the piston 15 then being moved to the left for turning the steering wheels 5 so as to steer the vehicle to the right. Obviously, a quarter turn of plug 34 intermediate these two positions will result in cutting off all communication between supply pipe 30 and pipes 37 and 38 so that the piston 15 will be maintained in a desired position. Naturally, as soon as the desired turning movement of the vehicle has been accomplished, the power is utilized to return the steering wheels to their normal position for travel straight ahead, whereupon the valve is turned to off position so as to maintain this normal condition of steering wheels 5.

A compression spring s seats the turn plug 34 in the tapered bore of the valve casing, and a cap c is threaded on one end of said valve casing to adjust the tension of said spring. Besides compensating for wear, this permits the turn plug 34 to lift against the action of spring s to act as a safety valve and relieve excess pressure when necessary.

The valve 26 is mounted on a side rail 40 of the chassis frame of the vehicle by means of an angular bracket 41 as clearly shown in Figures 2 and 5. This bracket has an upper horizontal portion receiving the lower flange of chassis rail 40 and secured thereto by set screws 42, the other or depending portion of bracket 41 having a threaded opening into which is screwed the inner end of valve 26 so as to support the latter transversely of the vehicle in front of the steering arm 13. The portion of plug 34 provided with passage 36 projects outwardly from the valve casing and forms a stem on which is secured an operating arm 43 operatively connected with the steering arm 13 by a link 44. Thus, the operation of valve 26 is established by the usual manual turning of steering shaft 11 of steering column 10. The opening in bracket 41 into which valve 26 is threaded is indicated at 45. Also, it is obvious that the pipes 37 and 38 may have any suitable provision for permitting flexing thereof where required so as to not interfere with the movement of tie rod 9 and cylinder 14 forwardly or rearwardly with respect to main axle section 8.

From the foregoing description, it is believed that the construction and operation, as well as the advantages of the present invention, will be readily understood and appreciated by those skilled in the art. The device is simple and compact in construction, easy to install, convenient to control, and efficient in operation. There are a minimum number of movable parts likely to get out of order and these are of a durable and long lasting nature. While the present device has been illustrated as the sole steering means, it may obviously be used jointly with the usual manual operation by simply retaining the mechanical connection between steering arm 13 and the arm 6a of the left hand steering knuckle 6. Manually operable relief valves 46 may be provided on the ends of cylinder 14 and opened to permit free movement of piston 15, whenever it may be desired to manually steer the vehicle in the usual way.

It will be seen that, in the event of a blowout of a tire of one of the wheels 5 or should said wheels strike an object or rut on the road, no shock will be transmitted to the steering shaft 11, and under all conditions the wheels 5 will be maintained as set by the fluid-pressure motor so as to insure effortless, safe steering at all times.

What I claim is:

1. In a compressed air operated steering device for a motor vehicle, wherein front steering and supporting wheels are journaled on stub axles pivoted to the ends of a main front axle section, wherein a tie rod connects said steering knuckles, and wherein a fluid-pressure motor including a cylinder and a piston is carried by said tie rod and movable in said cylinder, means for supporting said cylinder from said main axle section so as to restrain said cylinder against movement transversely of the vehicle and permit free movement of the cylinder forwardly or rearwardly relative to said main front axle section, said last-named means comprising a vertical substantially C-shaped bracket rigidly secured intermediate its ends to said main axle section and including rearwardly extending spaced upper and lower arms provided with end shoes, said cylinder having top and bottom transverse guideways intermediate the ends thereof in which said shoes are slidably engaged.

2. In a compressed-air operated steering device for a motor vehicle, wherein a compressed-air motor is operatively associated with the steering knuckle tie rod of the vehicle, means for controlling the operation of said compressed-air motor including a control valve of the turn plug type, a bracket carried by a side chassis rail of the vehicle and having a threaded opening, one end of said control valve being threaded into said opening of the bracket so as to support said valve transversely of the vehicle forwardly of the steering arm geared to the steering shaft of said vehicle, an arm carried by the rotatable plug of said control valve, and a link operatively connecting the last-named arm with said steering arm.

3. In a compressed-air operated vehicle steering device having a compressed-air motor, a control valve of the turn plug type including a casing provided at each of opposite sides with a supply port and a relatively smaller exhaust port, a turn plug journaled in said casing and provided at each end with an angular passage, said angular passages respectively opening through opposite ends of the turn plug for respective connection with a source of air under pressure and for communication with the atmosphere, one of said angular passages being arranged to connect the source of air under pressure with either desired supply port depending upon the position to which said turn plug is turned, and the other angular passage being adapted to simultaneously connect a predetermined exhaust port with the atmosphere, said angular passages being further so formed and arranged that turning of said turn plug will regulate the flow of air under pressure to either end of the motor and simultaneously correspondingly regulate the exhaust of air from the other end of said motor.

4. In combination with the running gear of an automobile including steering knuckles connected by a tie rod, a compressed-air motor operatively connected to said tie rod and including a cylinder having a piston movable therein, a source of air under pressure, a control valve operable to selectively provide communication between either desired end of said cylinder and the source of air under pressure and to simultaneously open an exhaust line from the other end of the cylinder to the atmosphere with the flow of the compressed air to one end of the cylinder regulated and the flow of the exhaust to the atmosphere restricted and correspondingly regulated so as to maintain a constant controlled back pressure on the opposite side of said piston from that against which the air under pressure is admitted.

5. In a compressed air operated vehicle steering device having a compressed-air motor, a control valve of the turn plug type including a casing having a tapered bore and provided at each of opposite sides with a supply port and a relatively smaller exhaust port, a tapered turn plug journaled in said casing and provided at each end with an angular passage, a compression spring seating said turn plug in said bore, means to adjust the compression of said sprinf, said angular passages respectively opening through the opposite smaller and larger ends of the turn plug for respective connection with a source of air under pressure and for communication with the atmosphere, one of said angular passages being arranged to connect the source of air under pressure with either desired supply port depending upon the position to which said turn plug is turned, and the other angular passage being adapted to simultaneously connect a predetermined exhaust port with the atmosphere, said angular passages being further so formed and arranged that turning of said turn plug will regulate the flow of air under pressure to either end of the motor and simultaneously correspondingly regulate the exhaust of air from the other end of said motor.

HARRY LELAND BAUMER.